United States Patent
Renner et al.

(10) Patent No.: US 7,881,442 B2
(45) Date of Patent: Feb. 1, 2011

(54) CALL ANNOUNCEMENT SERVICE

(75) Inventors: Peter Renner, Edison, NJ (US); Walter Rickard, Edison, NJ (US)

(73) Assignee: LSSi Data Corp., Orange, CA (US)

( * ) Notice: Subject to any disclaimer, the term of this patent is extended or adjusted under 35 U.S.C. 154(b) by 1138 days.

(21) Appl. No.: 10/886,464

(22) Filed: Jul. 7, 2004

(65) Prior Publication Data

US 2004/0240637 A1 Dec. 2, 2004

Related U.S. Application Data

(63) Continuation of application No. 09/800,949, filed on Mar. 7, 2001, now abandoned.

(60) Provisional application No. 60/187,791, filed on Mar. 8, 2000.

(51) Int. Cl.
*H04M 1/64* (2006.01)
*H04M 1/56* (2006.01)
*H04M 15/00* (2006.01)

(52) U.S. Cl. ............... 379/69; 379/142.06; 379/127.05

(58) Field of Classification Search ............ 379/211.02, 379/212.01
See application file for complete search history.

(56) References Cited

U.S. PATENT DOCUMENTS

| | | | | |
|---|---|---|---|---|
| 5,315,636 A * | 5/1994 | Patel | .................... | 379/201.07 |
| 5,327,486 A * | 7/1994 | Wolff et al. | .............. | 379/93.23 |
| 5,329,578 A * | 7/1994 | Brennan et al. | ........ | 379/211.03 |
| 5,436,967 A * | 7/1995 | Hanson | .................. | 379/210.01 |
| 5,471,519 A * | 11/1995 | Howe et al. | .............. | 379/88.26 |
| 5,835,573 A * | 11/1998 | Dee et al. | ................. | 379/88.26 |
| 5,862,208 A * | 1/1999 | MeLampy et al. | ..... | 379/212.01 |
| 5,873,032 A * | 2/1999 | Cox et al. | .................... | 455/417 |
| 6,014,439 A * | 1/2000 | Walker et al. | .......... | 379/266.01 |
| 6,104,786 A * | 8/2000 | Gibilisco et al. | ......... | 379/88.23 |
| 6,177,905 B1 * | 1/2001 | Welch | .................... | 342/357.13 |
| 6,275,577 B1 * | 8/2001 | Jackson | ................. | 379/211.01 |
| 6,295,341 B1 * | 9/2001 | Muller | ..................... | 379/88.18 |
| 6,327,478 B1 * | 12/2001 | Baker | ......................... | 455/466 |
| 6,404,860 B1 * | 6/2002 | Casellini | .................. | 379/88.17 |
| 6,438,216 B1 * | 8/2002 | Aktas | ....................... | 379/88.01 |
| 6,631,182 B1 * | 10/2003 | Schwab et al. | ........... | 379/88.19 |
| 6,665,380 B1 * | 12/2003 | Cree et al. | ............... | 379/88.25 |
| 7,027,576 B2 * | 4/2006 | Schwab et al. | ......... | 379/201.11 |
| 7,035,385 B2 * | 4/2006 | Levine et al. | ............ | 379/88.23 |
| 7,039,420 B2 * | 5/2006 | Koskinen et al. | ......... | 455/456.1 |
| 7,053,780 B1 * | 5/2006 | Straub et al. | ................ | 340/601 |
| 7,106,843 B1 * | 9/2006 | Gainsboro et al. | .......... | 379/191 |
| 7,233,792 B2 * | 6/2007 | Chang | ..................... | 455/422.1 |
| 7,634,069 B2 * | 12/2009 | Randall et al. | ........... | 379/93.17 |
| 2002/0086680 A1 * | 7/2002 | Hunzinger | .................. | 455/456 |

* cited by examiner

*Primary Examiner*—Joseph T Phan
(74) *Attorney, Agent, or Firm*—Winstead PC

(57) ABSTRACT

A method and operation for a call announcement service which answers incoming phone calls. The system retrieves identifying information about the calling party and provides that information to the called party. The called party can choose from several options for answering the call, such as completing the call with the calling party, sending the calling party to voice mail or terminating the call. In an alternative embodiment, the calling party can be notified that they have dialed a cellular phone customer, and can be provided the option of accepting the called party's cellular phone charges.

8 Claims, 2 Drawing Sheets

CALL ANNOUNCEMENT SERVICE

This application is a continuation of U.S. patent application Ser. No. 09/800,949, filed on Mar. 7, 2001 now abandoned. U.S. patent application Ser. No. 09/800,949 claims priority to provisional patent application Ser. No. 60/187,791, filed on Mar. 8, 2000.

BACKGROUND OF THE INVENTION

1. Field of the Invention

The present invention relates to a system and method for the automatic screening and disposition of telephone calls, and more particularly to a system having the option whereby the calling party can agree to accept all phone company charges for the call, including cellular phone charges normally the responsibility of the called party.

2. Description of the Prior Art

Telephone answering systems are well known in the prior art. These include, for example, simple machines such as a telephone answering machine directly connected to a telephone for recording phone messages, internal voice mail for a phone system and call routing systems for transferring calls to the appropriate extension within an office building. With a simple answering machine, a called party can "screen" incoming calls by listening to the message as it is being recorded by the calling party and decide whether to answer the call by picking up the phone and talking directly to the calling party. In conjunction with caller ID systems, for example, wherein the number of the calling party is also displayed for immediate identification of the calling party, the called party can decide whether or not to answer that particular call. With an internal voice mail system, a called party can automatically route his or her calls to the voice mail system such that the called party's phone never rings and the calling party is immediately directed to leave a message for the called party. In this instance, the called party may never know that someone is calling or that an important message is being delayed in its transmission to the called party. In addition, if the called party is already on the phone, the calling party is either directed to voice mail or a phone routing system will direct that call to the called party's secretary or to another extension so that the calling party's call can immediately be answered. In either of these situations, it is required that someone within the called party's organization be available to answer the call in order to "screen" incoming calls so that the called party can answer only those calls which he or she deems important.

Typically, for cellular phone customers, whether or not the customer is the calling party or the called party, the cellular phone customer must pay for all usage charges on the cellular system. While digital cellular phone systems allow caller ID services, the retrieval of this information is not always successful. Having caller ID information, a called party cellular customer can screen incoming calls and not answer the phone such that the calling party must leave a message in the person's voice mail, the called party still must incur cellular usage charges in order to retrieve that message from the voice mail. Thus, a cellular customer called party is given no option as to whether or not to accept charges for an unwanted incoming cellular call.

In addition to some of these call routing systems, occasionally a calling party may feel frustrated with having to leave a message rather than talking to a person directly when an important call must be taken by the called party as soon as possible. It would be advantageous, therefore, if an intermediate system could answer the calling party's call such that the called party can then be notified who is calling and whether or not that party is willing to accept all of the charges normally the responsibility of the called party.

SUMMARY OF THE INVENTION

The above objects and advantages are attained by the present invention, according to which, briefly stated a telephone call announcement system comprising a means for answering a phone call initiated by a calling party, a means for announcing a greeting to the calling party, a means for obtaining information about the calling party from a database, a means for announcing receipt of the call from the calling party to the called party, including means for announcing an identity of the calling party, a means for providing call answering options to called party and for receiving call answering instructions from the called party; and a means for completing the phone call according to the call answering instructions received from the called party.

A method of answering a telephone call from a calling party to a called party, said method comprising the steps of using a call answering system to answer the telephone call from the calling party, obtaining information about the calling party from a database, the information including identity of the calling party, announcing the telephone call to the called party, including the identity of the calling party, providing call answering options to the called party, receiving call answering instructions from the called party and completing the telephone call according to the call answering instructions received from the called party.

DETAILED DESCRIPTION OF THE PREFERRED EMBODIMENTS

Figure 1:
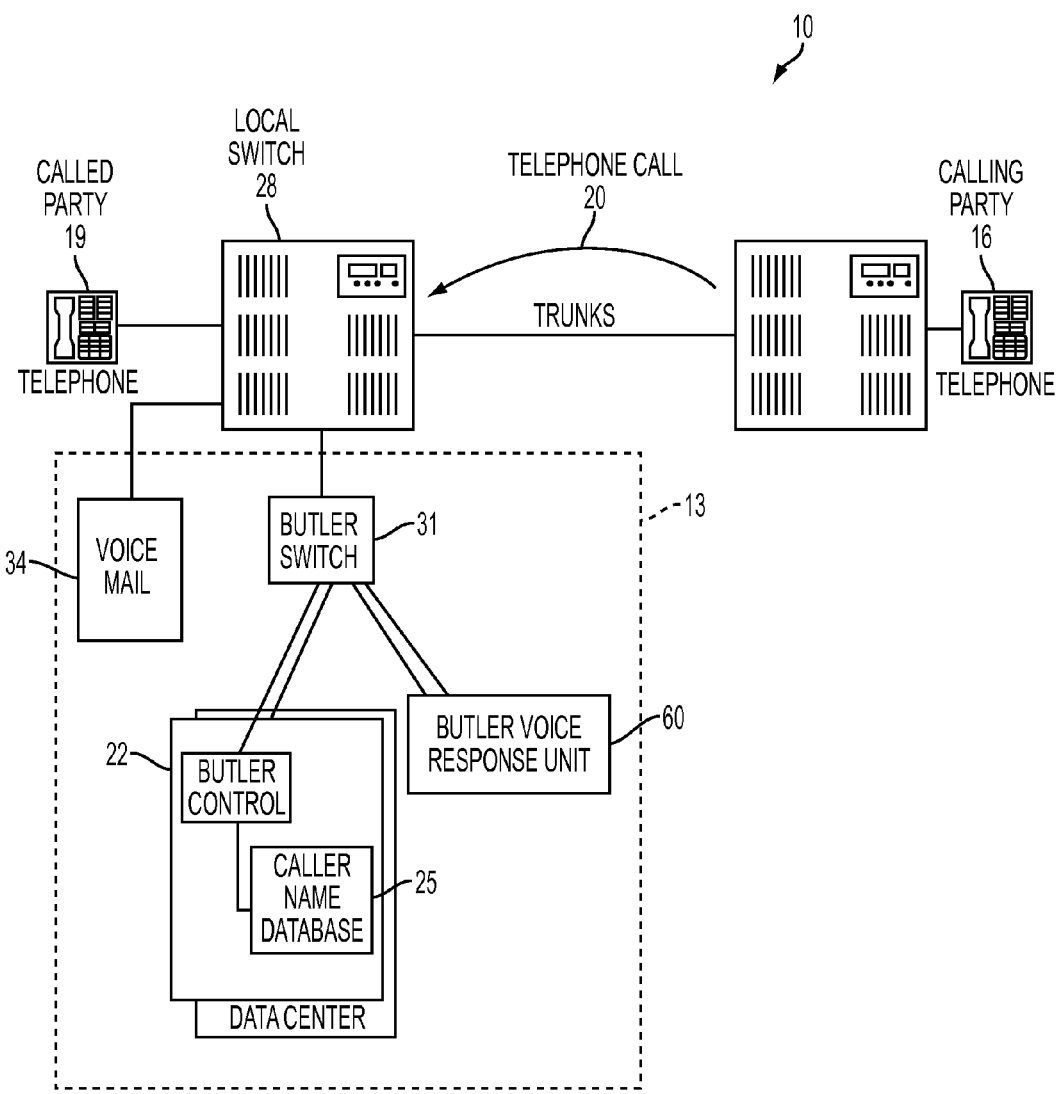
FIG. 1 is a schematic diagram of the call announcement system of the present invention.

As shown in the FIG. 1, the call answering system 10 of the present invention provides an intermediate telephone call answering scheme, referred to herein as a "phone butler", will answer the calling party's 16 incoming call and announce to the called party 19 who that person is. In this manner, if the called party 19 happens to already be on a call or is merely screening the call waiting for the actual calling party to initiate a phone call, the called party can screen the call at the same time that the calling party can have their call answered by the phone butler 13. The called party 19 is provided with information such as the identity of the calling party 16 and is given a series of call disposition choices by a controller 22 which may include accepting the call, routing the call to a recording device, or terminating the call altogether. In this manner, the called party 19 does not have to rely on information provided by the calling party 16, which may or may not be completely accurate, such as a telemarketer which may unintentionally or intentionally mislead a called party. Thus, the present invention allows the called party 19 to make a decision on how to dispose of the incoming call without the calling party's 16 knowledge.

The invention eliminates the need for a separate caller ID display system. By using a national caller name database, the phone butler 13 can pull from this database, based on the calling party's incoming phone number, the identity of the actual calling party 16 and announce that identity to the called party 19. The called party will have this information directed to him or her which exists in the calling name database 25 for the calling party's number. Thus, the present invention gives the called party the screening capability on all incoming calls, even when they may already be on a different phone call using the existing phone's call waiting feature.

Figure 2:
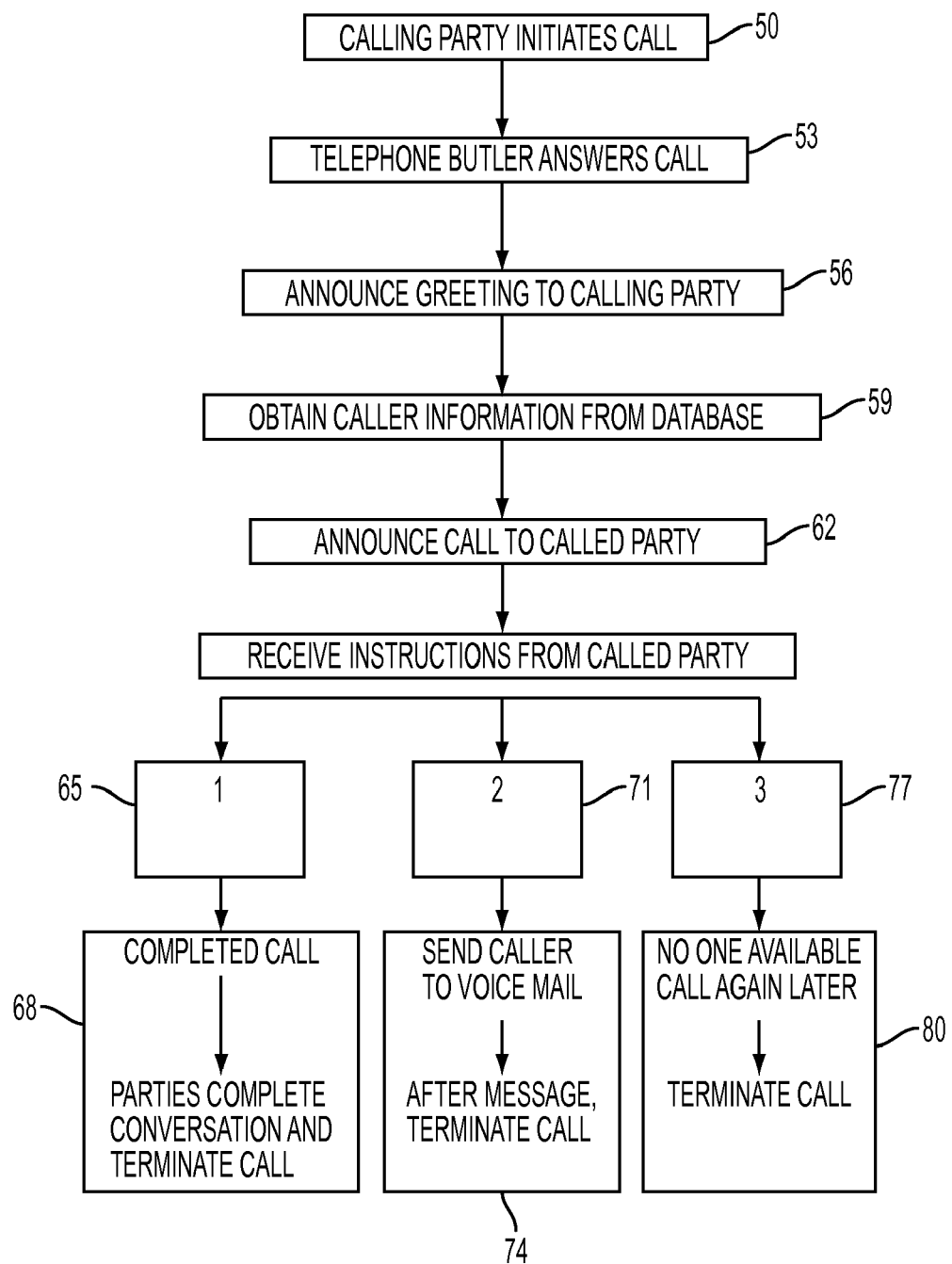
FIG. 2 is a flow chart of incoming call management by the call announcement system of the present invention.

In a most preferred embodiment, as shown in FIG. 2, the call answering system of the present invention provides each customer with his or her own "telephone butler" 13 to manage all incoming phone calls by utilizing a call announcement service (CAS), giving the customer or called party 19 the choice of whom to talk to. When an incoming call 20 is identified as a CAS call (i.e., a call to a customer who has subscribed to the CAS service), the call is routed by the terminating local telephone switch to the CAS or phone butler equipment 13 which answers the call 53. The calling party 16 will hear a greeting message 56, such as "This is CAS, your phone butler, please hold while I announce your call." The CAS then obtains information about the calling party from the database 59 (which is preferably database 25 shown in FIG. 1). The butler switch then initiates a call to the called party 19 via the local switch 28. When the called party 19 answers his or her phone call, a voice message is played by the voice response unit 60 announcing the call 62, such as "You have a call from Mary Jones in California, please press 1 to complete the call, press 2 to send the call to voice mail or 3 to terminate the call." In one embodiment, in the event that no identity information is available about the calling party in the database, the CAS may be programmed to automatically terminate the call with option 3 or route the call to voice mail as with option 2, since it may be a telemarketor attempting to conceal his or her identity.

If the customer presses 1 at decision box 65, the calling party 16 will hear a second greeting message such as "I am completing your call now" and the call is connected through to the called party's phone 19 at which point the parties complete their conversation and terminate the call 68. Alternatively, if the customer presses 2 at decision box 71 the calling party will hear a further greeting message such as "No one is available to take your call, please press 1 or say 'yes' if you would like to leave a message." This would cause the call to be re-initiated into the voice mail system and lead to other voice messaging menus, well known in the art. The caller can either terminate the call or leave a voice mail message and hang up 74. The final alternative, if the customer presses 3 at decision box 77, the calling party may hear a message such as "No one is available to take your call right now, thank you for calling, please try again later." The call is then terminated at block 80.

As shown in FIG. 1, incoming CAS calls from the calling party 16 will be routed from the local switch 28 to the phone butler switch 31. The initial audio announcement played by voice response unit 60, will be played to the calling party 16, controlled by the phone butler controller 22. Calling number information will be forwarded to the calling name database 25. The calling name is then sent back to the voice response unit 60 and inserted in the message to be played to the called party 19. The voice response unit 60 will wait for instruction 1, 2 or 3 and based on the response, the butler controller 22 will instruct the butler switch 31 to take the appropriate action. If the called party 19 does not answer, the butler switch 31 terminates the call to the called party. For the response to the calling party 16, it is preferred that the system defaults to option 2 so that the butler switch 31 reinitiates a call to voice mail and connects to the called party 16. If no name is available in the calling name database 25, the calling location or other identification can be provided based on the phone number of the calling party.

In another preferred embodiment, the present invention has particular applicability to mobile or cellular phone customers. On such a call, the calling party 16 can be provided an additional option of paying all the cellular charges for the called party 19. Also preferably it is set up as a default that the mobile customer or cellular customer as the called party 19 will not accept a call unless the calling party 16 agrees to pay for such charges. Since no additional equipment is required to be physically attached to the phone of the called party 19, no additional equipment is needed in order for the phone butler 13 to work for cellular customers as well as traditional phone company customers. Alternatively, the called party's cellular charges can be minimized by activating the phone butler 13 to announce who the calling party is and the called party can immediately choose option 3 without having to worry about accepting an unwanted voice mail message by terminating the call immediately.

An important aspect of the present invention is the use of the database information to allow the called party to decide how to dispose of an incoming call. By having an intermediate CAS system, no additional equipment such as caller ID display devices or answering machines are necessary. Thus, the invention can be used for any live incoming call from any source. In addition, the present invention may be utilized by local phone companies to provide the telephone butler service directly to their customers. The local telephone companies may also use the Advanced Intelligent Network architecture as a means to implement this service.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the appended claims and on any an all equivalents thereof.

We claim:
1. A method of answering a telephone call from a calling party to a called party, said method comprising:
   using a call answering system to answer the telephone call from the calling party;
   obtaining information about the calling party from a source other than the calling party, the obtained information including an identity of the calling party, the source comprising a database that includes names;
   announcing to the calling party that the called party is being contacted to determine if the called party is available to answer the call;
   placing the calling party on hold pending receipt of call answering instructions from the called party;
   announcing, via a second telephone call initiated by the call answering system to the called party, the telephone call from the calling party, including audibly announcing the identity of the calling party using the obtained information;
   providing call answering options to the called party;
   receiving the call answering instructions from the called party, the call answering instructions being a selected one of the provided call answering options;
   providing an option to the calling party to accept the called party's cellular telephone usage charges;

terminating the telephone call if the calling party does not accept the called party's cellular telephone usage charges; and completing the telephone call according to the call answering instructions received from the called party if the calling party does accept the called party's cellular telephone usage charges.

2. The method as recited in claim 1, wherein said step of providing call answering options further comprises providing an option to connect the call, providing a record option to send the calling party to a voice mail unit and providing an option to terminate the call.

3. The method as recited in claim 1, wherein the step of announcing a greeting to the calling party further includes announcing to the calling party that the called party is a cellular telephone customer.

4. The method as recited in claim 3, wherein said step of providing call answering options further comprises providing an option to connect the telephone call, providing a record option to send the calling party to a voice mail unit and providing an option to terminate the telephone call.

5. A telephone call announcement system, the telephone call announcement system comprising:

a switch in communication with a telephone network;

a voice-response unit coupled to the switch;

a controller in communication with the switch and the voice response unit, the controller operable to control the switch and the voice response unit, the operability to control comprising operability to:

answer a telephone call from a calling party to a called party;

obtain information about the calling party from a source other than the calling party, the obtained information including an identity of the calling party, the source comprising a database that includes names;

announce to the calling party that the called party is being contacted to determine if the called party is available to answer the call;

place the calling party on hold pending receipt of call answering instructions from the called party;

announce, via a second telephone call initiated by the telephone call announcement system to the called party, the telephone call from the calling party, the announcement comprising audibly announcing the identity of the calling party using the obtained information;

provide call answering options to the called party;

receive the call answering instructions from the called party, the call answering instructions being a selected one of the provided call answering options;

provide an option to the calling party to accept the called party's cellular telephone usage charges;

terminate the telephone call if the calling party does not accept the called party's cellular telephone usage charges; and complete the telephone call according to the call answering instructions received from the called party if the calling party does accept the called party's cellular telephone usage charges.

6. The system according to claim 5, wherein the operability to control comprises operability to provide a record option to send the calling party to a voice mail unit and operability to provide an option to terminate the telephone call.

7. The method as recited in claim 5, wherein the operability to control comprises operability to announce to the calling party that the called party is a cellular telephone customer.

8. The method as recited in claim 7, wherein the operability to provide call answering options further comprises operability to:

provide an option to connect the telephone call;

provide a record option to send the calling party to a voice mail unit; and provide an option to terminate the telephone call.

\* \* \* \* \*